(12) United States Patent
Martin et al.

(10) Patent No.: US 11,745,430 B2
(45) Date of Patent: Sep. 5, 2023

(54) CALIBRATION METHOD AND BUILD UNIT

(71) Applicant: HEWLETT-PACKARD DEVELOPMENT COMPANY, L.P., Houston, TX (US)

(72) Inventors: Pau Martin, Sant Cugat del Valles (ES); Francesc Salas Roura, Sant Cugat del Valles (ES); Anna Torrent, Sant Cugat del Valles (ES); Marius Valles, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 1259 days.

(21) Appl. No.: 16/094,272

(22) PCT Filed: May 12, 2016

(86) PCT No.: PCT/EP2016/060657
§ 371 (c)(1),
(2) Date: Oct. 17, 2018

(87) PCT Pub. No.: WO2017/194110
PCT Pub. Date: Nov. 16, 2017

(65) Prior Publication Data
US 2019/0111628 A1    Apr. 18, 2019

(51) Int. Cl.
| | |
|---|---|
| *B29C 64/393* | (2017.01) |
| *B29C 64/386* | (2017.01) |
| *B33Y 50/00* | (2015.01) |
| *B29C 64/245* | (2017.01) |
| *B29C 64/241* | (2017.01) |
| *G06F 1/03* | (2006.01) |
| *G06F 17/18* | (2006.01) |

(Continued)

(52) U.S. Cl.
CPC .......... *B29C 64/393* (2017.08); *B29C 64/241* (2017.08); *B29C 64/245* (2017.08); *B29C 64/386* (2017.08); *B33Y 50/00* (2014.12); *G06F 1/03* (2013.01); *G06F 17/18* (2013.01); *B33Y 30/00* (2014.12); *B33Y 50/02* (2014.12)

(58) Field of Classification Search
CPC combination set(s) only.
See application file for complete search history.

(56) References Cited

U.S. PATENT DOCUMENTS

| | | |
|---|---|---|
| 2015/0273768 A1 | 10/2015 | Wyatt |
| 2015/0321419 A1 | 11/2015 | Linthicum et al. |
| 2016/0023403 A1 | 1/2016 | Ramos |

FOREIGN PATENT DOCUMENTS

| | | |
|---|---|---|
| CN | 101124712 | 2/2008 |
| CN | 101253391 A | 8/2008 |

(Continued)

OTHER PUBLICATIONS

"H-Series 3D Printer"; Oct. 2, 2013; http://afinia.com/newsite/wp-content/uploads/Afinia-3D-Printer-Users-Manual.pdf.

*Primary Examiner* — Lam S Nguyen
(74) *Attorney, Agent, or Firm* — SHOOK, HARDY & BACON L.L.P.

(57) ABSTRACT

A method of calibrating movement of a platform is described, the method comprising: in a calibration run, causing movement of the platform; detecting a plurality of positions of the platform during the movement; deriving a movement pattern from the plurality of positions; and determining an adjustment of the movement of the platform based on the movement pattern.

16 Claims, 8 Drawing Sheets

(51) Int. Cl.
  *B33Y 30/00* (2015.01)
  *B33Y 50/02* (2015.01)

(56) References Cited

FOREIGN PATENT DOCUMENTS

| | | |
|---|---|---|
| CN | 101587327 A | 11/2009 |
| CN | 103660300 | 3/2014 |
| CN | 104057612 | 9/2014 |
| CN | 203805320 | 9/2014 |
| CN | 104859151 A | 8/2015 |
| CN | 104875385 | 9/2015 |
| WO | WO-2015082935 | 6/2015 |
| WO | WO-2015083104 | 6/2015 |
| WO | WO-2016050321 | 4/2016 |

CALIBRATION METHOD AND BUILD UNIT

BACKGROUND

In the additive manufacturing technology, using so-called three-dimensional (3D) printers, for example, three-dimensional objects are built by adding successive layers of material to form a series of cross-sections which are joined to create a final object. The material may be a powder, such as plastic, metal, or other composite materials, and the material may be fused to create the final shape. Another additive manufacturing technologies may form a layer of powder, and then selectively solidify portions of the layer to form a fused/sintered cross-section of an object The successive layers may be formed on top of a platform which moves vertically during the manufacturing process. The quality of the objects produced by additive manufacturing may vary widely depending on a number of parameters, including the advance precision of the platform movement.

DETAILED DESCRIPTION OF DRAWINGS

Figure 1:
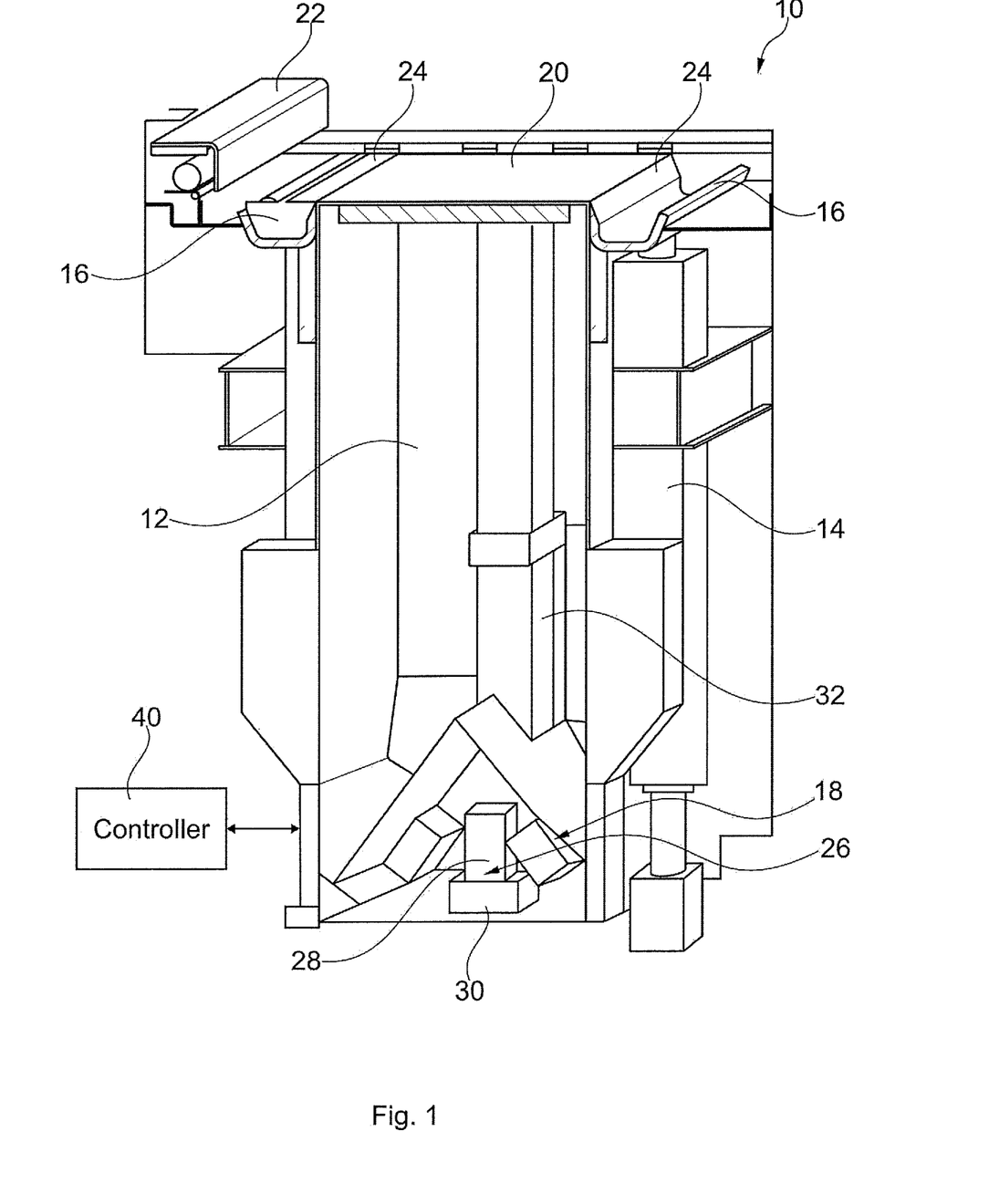
FIG. 1 shows a schematic diagram of an example of a build unit.

FIG. 1 shows a schematic sectional view of a build unit 10 for a three-dimensional (3D) printer (not shown in FIG. 1). The build unit 10 is an example of a powder storage and delivery system. Whereas, in the following description, reference is made to powder, other additive manufacturing materials can be used, and the expression "powder" is meant to comprise also these other additive manufacturing materials, where appropriate.

The example of the build unit 10 shown in FIG. 1 comprises a powder supply container 12, for containing powder to be used in the additive manufacturing process; a feed mechanism 14 for moving the powder from the supply container 12 to a feed tray 16; and a vibrator system 18. The powder supply container 12, in the example considered, is placed below a print zone. The feed mechanism 14 may comprise an Archimedes screw for lifting the powder from the bottom of the powder supply container 12 to the feed tray 16 which is just slightly below a print zone level. The vibrator system 18 in an example may comprise an eccentric mass turning at high speed to cause a vibration which is transmitted to the bottom surface of the powder supply container 12 to assure that the feed mechanism always is fed with powder. The feed trays 16, in the example shown in FIG. 1, each comprise a channel type profile which provides a deposit region at either side of the print zone, e.g. at the front and rear sides of the print zone in a printing direction. The feed trays 16 may be placed slightly below the print zone level, e.g. about 40 mm below the print zone level, to not interfere with a recoater system movement, explained further the below. The feed tray 16 may collect powder provided by the feed mechanism 14 and recovered powder which is left over from the deposition of a previous layer.

The build unit 10 further comprises a build platform 20 which may be a metal base upon which successive layers of powder are deposited during the additive manufacturing process. A new layer is built on top of the previous layer, usually after fusing energy has been applied to the previous layer. During the additive manufacturing process, the build platform moves downward step by step in defined increments corresponding to the layer thickness to make room for the next layer of powder. Examples of layer thicknesses can be in the range of 0.02 to 0.4 mm, such as about 0.05 mm, about 0.1 mm, or about 0.2 mm. The more accurate the downward movement of the build platform is, the more constant and reliable is the layer thickness, yielding an improved quality of the final 3D objects produced. The demand for accuracy in the advance of the build platform 20, also referred to as "layer advance", increases as the resolution and quality demand of the 3D objects increase, thereby reducing the tolerances permitted in advancing the platform. Assuming a layer thickness of 0.1 mm, for example, layer advance precision should be in the range of +/−0.005 mm. If the precision falls outside of this range, there is a risk, in some cases, of thermal bleeding and other artifacts which can have a negative influence on the accuracy and mechanical properties of the manufactured object.

The build unit or the printer to be used in combination with the build unit further comprises a recoater system 22 distributing the powder across the build platform 20. The recoater system 22 cooperates with vanes 24 to spread the powder across the print platen 20. The vanes 24 can collect the powder from the base of the feed tray 16 wherein the maximum movement angle of vanes can be used as feedback indication about the amount of powder present in the feed tray 16. This information can be used to drive the feed mechanism 14 to supply additional powder to the feed tray 16. The vanes 24 sunk in the powder are rotated upwards to lift a prism of powder to a feeding position. Further, the recoater system 22, including a roller, pushes the powder from the vane 24 to the build platform 20. In the example shown, the recoater system is a sliding carriage which carries a counter-rotating roller. The roller pushes the prism of powder to the build platform 20. When the carriage moves, the prism of powder pushed by the roller progressively decreases. This way, a powder layer can be deposited on top of the build platform 20 or the previous powder layer, forming a new layer of powder having predefined thickness, such as 0.1 mm.

The build unit 10 shown in FIG. 1 further comprises a drive mechanism 26, which may comprise a motor 28 and a gear unit 30. The motor 28 may be a DC drive motor, such as a permanent magnet stepping motor. More particularly, the motor 28 may be a servomotor, i.e. a rotary actuator or linear actuator that allows for control of angular or linear position, velocity and acceleration. It is an electrical motor including a sensor or encoder for position feedback. The gear unit 30 may comprise a reduction gear, a multistage gear, a planet gear, or a combination thereof. The drive mechanism 26 is coupled to a lead screw (not shown in FIG. 1) which transmits the motor rotation via the gear unit 30 to the build platform 22. An encoder and/or sensor (not shown in FIG. 1), such as an optical sensor, can be coupled to an output shaft of the motor 28, the gear unit 30 or the lead screw 34 to monitor rotation of the lead screw 34. Alternatively, two or more encoders or sensors can be provided at two or more of the motor, the gear unit, and lead screw. The sensory system can be used to detect each complete revolution of the lead screw 34.

The lead screw 34 is surrounded by a guide structure 32 supporting the build platform 20.

Operation of the build unit 10 can be controlled by a controller 40 which can provide drive and control signals to the build unit 10 for controlling the feed mechanism 14, the vibrator system 18, the recoater system 22 and vanes 24, and the drive mechanism 26 causing the build platform 20 to move upward and downward. The controller 40 can be provided within the build unit 10 or externally. In one example, the controller 40 may comprise a microprocessor, a memory, and an interface for communicating with the build unit and other equipment, e.g. with an associate printer, a control station or the like. The controller 40 further may comprise a dedicated motor driver.

Figure 2:
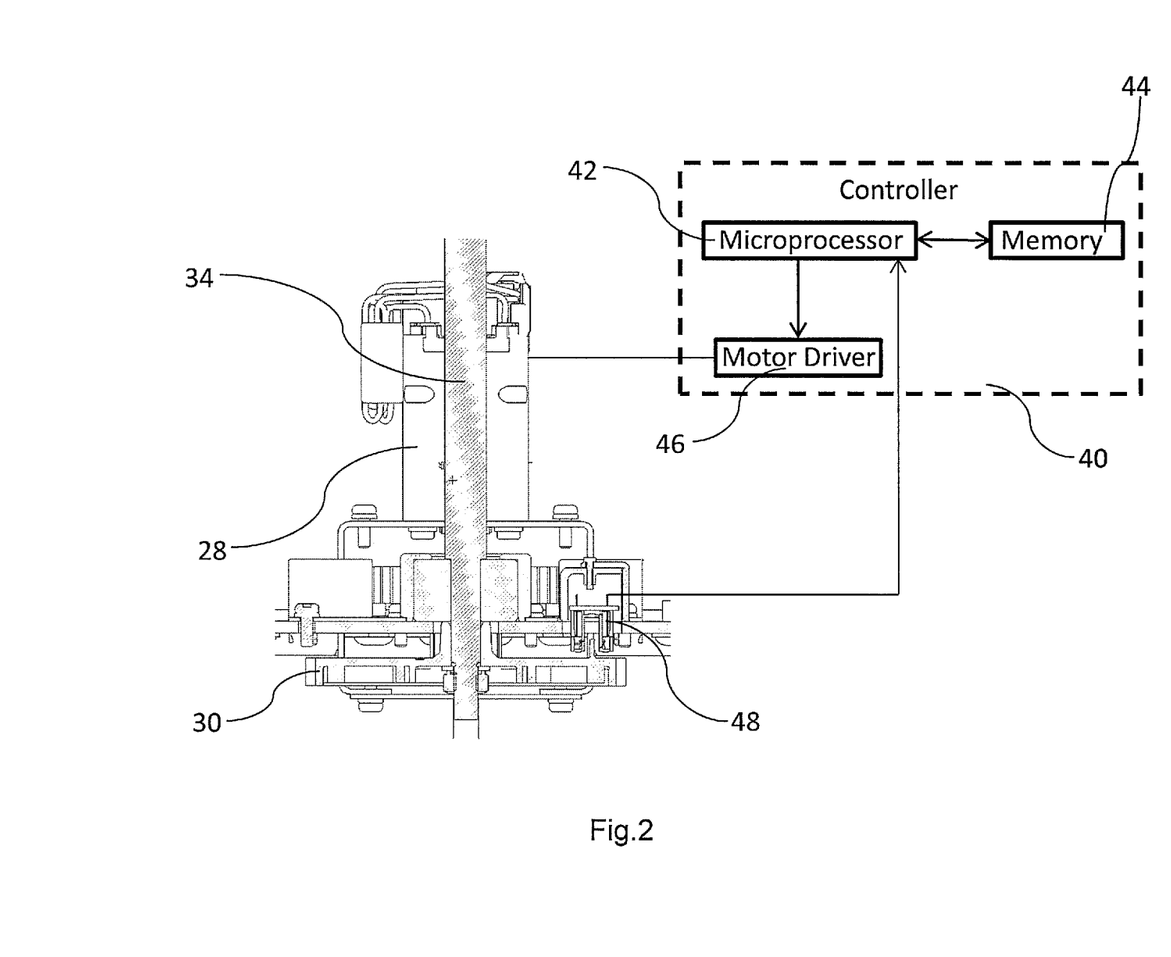
FIG. 2 shows a schematic diagram of an example of a drive mechanism of a build unit.

FIG. 2 shows further details of the drive mechanism 26 according to one example. In FIG. 2, using the same reference numbers as in FIG. 1, the motor is generally shown at 28, and the gear unit is shown at 30. FIG. 2 further shows the lead screw 34 which is driven by the motor 28 via the gear unit 30. FIG. 2 also illustrates the controller 40, the controller comprising microprocessor 42, a memory 44, and a motor driver 46. The motor driver 46 is coupled to the motor 34 to control rotation thereof. The gear unit 30 includes a sensor 48 for detecting the revolution of the final gear stage which is connected to the lead screw 34. The lead screw 34 is guided in guide structure 32 and causes the build platform 22 move vertically upon rotation of the lead screw 34. The gear unit 30 that drives the lead screw 34 may include a feature which can be detected by the sensor every complete revolution of the lead screw or of a final gear stage. The sensor can be used for indexing the lead screw rotation or revolution. The sensor 48 may be implemented as an optical sensor. The sensor 48 is coupled to the controller 40. The motor 28 may include an additional rotation encoder and any other sensory equipment for controlling operation of the motor, such as Hall sensors or the like.

Improvements of the accuracy of the movement of build platform, or layer advance, directly increase the precision of the manufactured 3D object. Increasing the accuracy of the layer advance allows manufacturing 3D objects with better dimensional tolerances and better mechanical properties because of the improved homogeneity of the manufactured object. The mechanical parts of the drive mechanism, including the lead screw, are subject to manufacturing tolerances. Due to these mechanical tolerances, such as a mechanical run out of the lead screw and/or the gear unit, a rotation of the motor by constant increments will not always result in a layer advance of the build platform in constant increments. As a consequence, driving the motor to rotate in a sequence of steps corresponding to equal rotation angles will not always result in a layer advance by constant increments. For example, a mechanical run out of the lead screw can cause a sinusoidal variation of the increment pitch of the vertical movement of the build platform. Since such sinusoidal errors are repetitive in nature, they can be observed easily by the naked eye and hence degrade the quality of the manufactured object. Such sinusoidal errors not only cause dimensional errors of the manufactured object, but also look and feel errors. If these errors can be compensated, the manufacture and assembly of the parts related to the platform transmission, such as the gear unit and lead screw, could be relaxed in terms of tolerances and required precision. Cost and time of manufacture and assembly of the platform transmission hence could be decreased.

The present disclosure provides a system and a method of calibrating movement of the build platform and a build unit operating based on the calibration result. Calibrating movement of the build platform improves dimensional tolerances of the manufactured object and homogeneity thereof. An example of a system for calibrating vertical movement of a build platform in a build unit may comprise: a structure for receiving the build unit; guides contacting the build platform, said guides supported by the structure; at least one sensor; a processor controlling the sensor, wherein the processor and the at least one sensor are arranged to determine a plurality of vertical positions of the build platform during movement of the build platform; to derive a movement pattern from the plurality of vertical positions determined; and to determine a movement correction term based on the movement pattern. The processor and the at least one sensor can be arranged to determine at least two of a first set of vertical positions when the build platform is close to a top level of the build platform; a second set of vertical positions when the build platform is close to a bottom level of the build platform; and a third set of vertical positions when the build platform is close to a middle level of the build platform. They further may be arranged to determine a movement pattern from the at least two sets of vertical positions and to determine a correction term therefrom, wherein the correction term is used for adjusting the vertical movement of the build platform over its entire vertical movement range.

Figure 3:
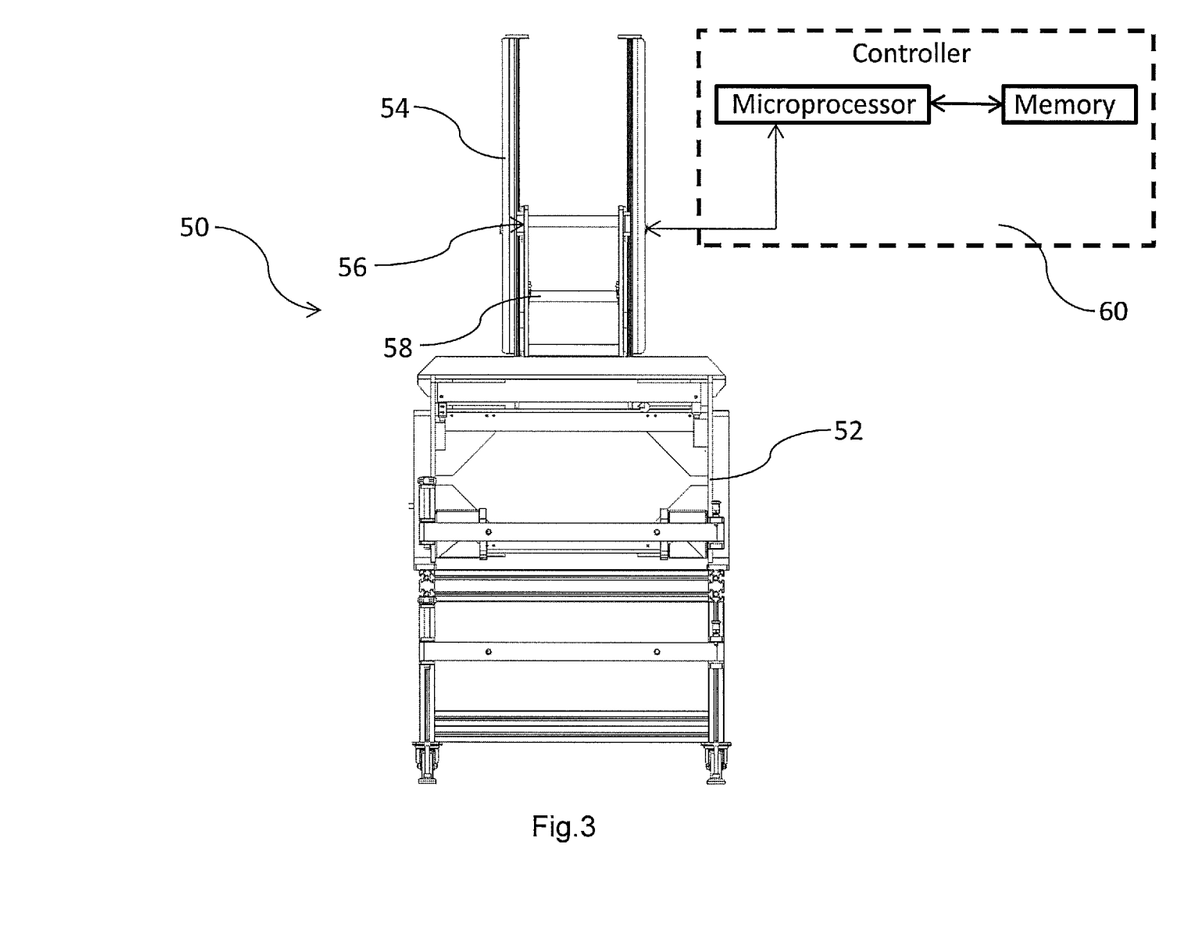
FIG. 3 shows a schematic diagram of an example of a calibrating tool.
Figure 4:
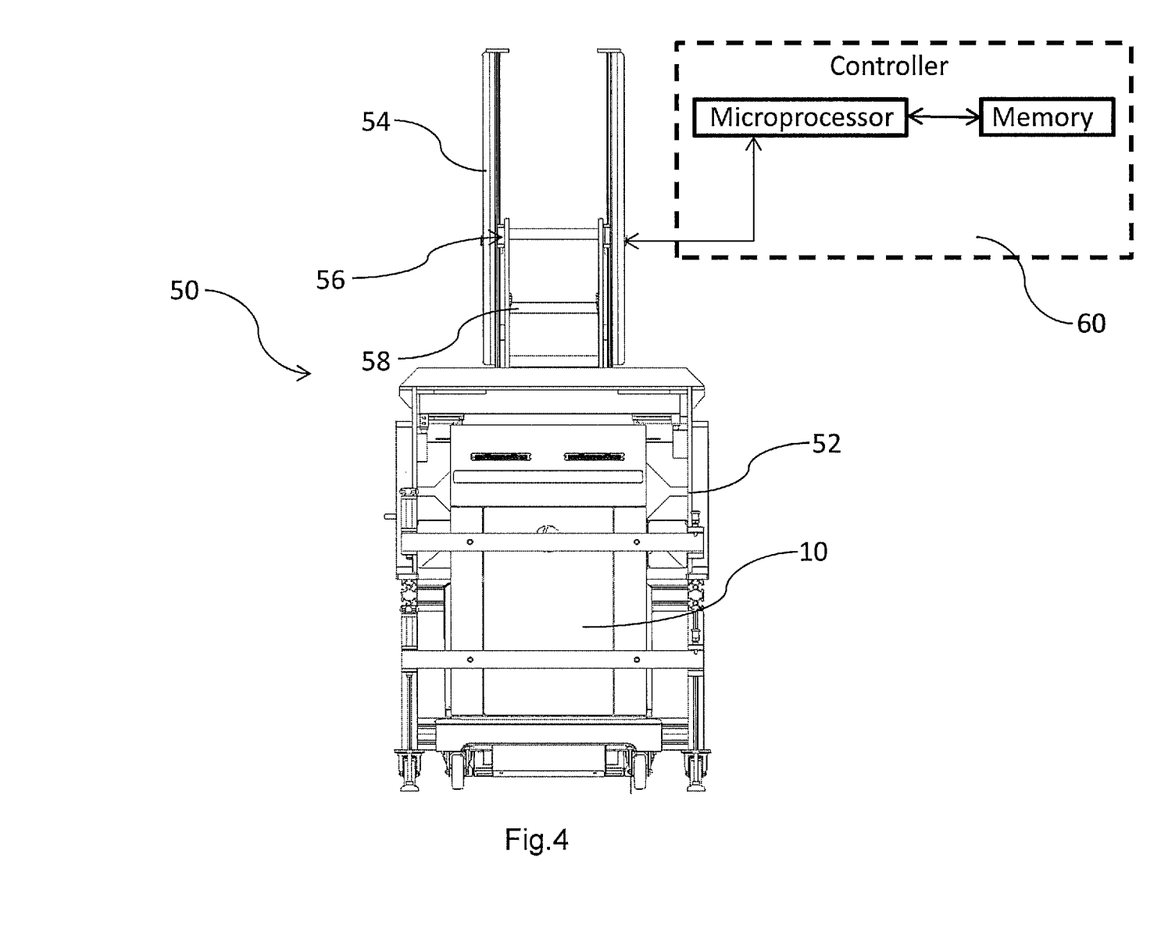
FIG. 4 shows a schematic diagram of the calibrating tool of FIG. 3, in combination with a build unit.

A more specific example of a calibration tool 50 is shown in FIGS. 3 and 4. The function of the calibration tool 50 is to measure the position and/or movement of the build platform 20 at one or several points of the platform. In one example of the calibration tool, the measurement of the platform position and/or movement can be a direct measurement having a high accuracy, such as an accuracy in the range of 0.01-0.001 mm, more specifically of about 0.003 mm or about 0.004 mm or about 0.005 mm. The accuracy of the position and/or movement measurement can be related to the increment pitch of the layer advance. The accuracy should be sufficiently good to detect a deviation from a nominal layer advance increment of less than 10% of the increment pitch, or less than 5% of the increment pitch, or even less than 4% of the increment pitch. If the pitch of the layer advance is 0.1 mm, for example, the accuracy of the calibration tool should be 0.005 mm or below, such as 0.003 mm or 0.004 mm.

The example of the calibration tool 50, shown in FIGS. 3 and 4, comprises a tool structure 52, for supporting linear guides 54, the guides supporting and guiding a contact displacement sensor 56. In the example shown, the contact displacement sensor 56 is associated with a sliding unit 58 which will come to rest against the top surface of the build platform once the build unit 10 is inserted into the calibration tool 50, as shown in FIG. 4. The linear guides 54 guide and contact the sliding unit 58, resting upon the build platform 20 during its vertical movement, wherein no force or substantially no force is applied, but for gravity. The sensor 56 can be an optical sensor, and can comprise an optical linear encoder, which can measure the step wise vertical movement of the build platform, corresponding to the layer advance. The output signal of the sensor 56 is fed to a controller 60 or other data processing unit. The controller 60 also can control operation of the calibration tool 50, for example by triggering and controlling operation of the sensor 56. In the example shown, the controller 60 comprises a microprocessor and memory.

In the drawing of FIG. 4, a build unit 10 is shown to be inserted into the calibration tool 50 wherein the sliding unit 58, including the sensor 56, rests on the build platform which is not visible in FIG. 4.

Once the build unit 10, or powder delivery system, is placed inside the calibration tool 50, the tool can measure the build platform layer advance through a set of layers or movement increments. In theory, if all mechanical parts were perfect, there should be no error in the layer advance and the layer advance increment should be constant, layer after layer. However, due to several potential error contributors, the signal detected by the sensor 56 and describing the vertical movement of the build platform may have a sinusoidal component. Examples of such "error contributors" are mechanical run outs between the motor and lead screw, which may be caused by a mechanical run out of the lead screw as such, a mechanical run out of the gear unit or of the motor shaft versus the gear unit, a mechanical run out of the lead screw versus its nut, a mechanical run out of the lead screw versus its bearings, a mechanical run out of the bearings versus the bearing housing, or an error in perpendicularity between the lead screw and the nut.

Figure 5:
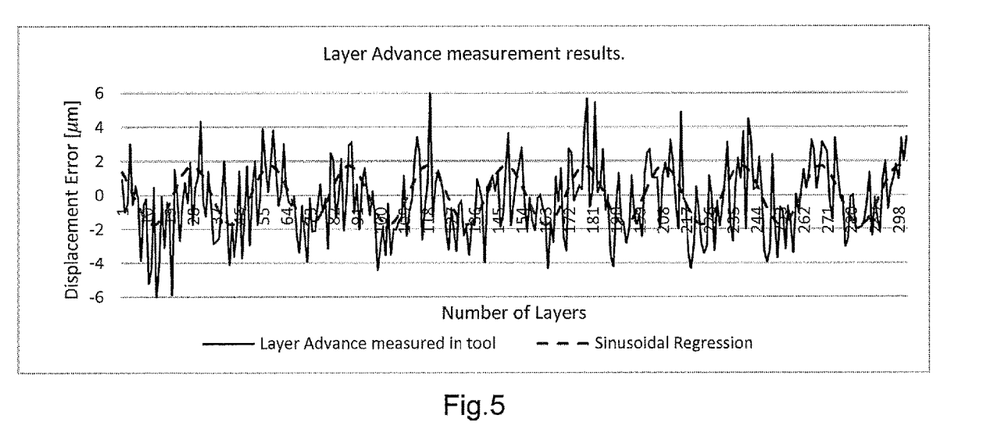
FIG. 5 shows a schematic chart of an example of measurement data relating to the platform advance.

FIG. 5 shows an example of a measurement result obtained by the contact displacement sensor 56 when measuring the layer advance increment for a build unit which has not been calibrated. Without calibration, the controller 40 of the build unit will drive the motor 28 to rotate in equal steps wherein each step corresponds to a defined rotation angle output for the shaft of the motor. Assuming that the drive mechanism of the build unit is affected by one or more mechanical errors, as described above, these repeatable mechanical errors will lead to an error of the layer advance increment having a repeatable component which often can be described by a sinusoidal term. This sinusoidal term can be derived from the measurement result by a regression algorithm, such as a least square algorithm (LSQ) or any other similar method.

Figure 6:
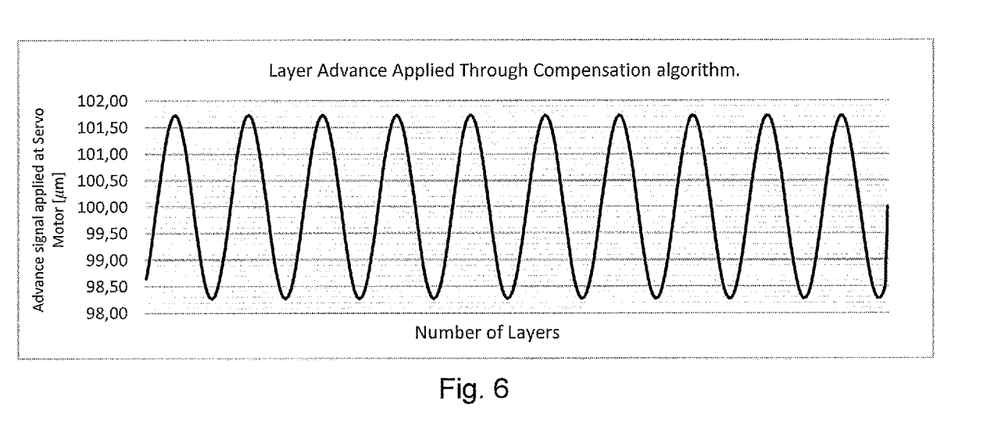
FIG. 6 shows a schematic chart of an example of a correction term relating to the platform advance.

In more detail, FIG. 5 shows the measurement of a displacement error (in micrometer), i.e. a deviation from a nominal layer advance increment for a series of 298 layer advances. The continuous line in FIG. 5 represents the individual measurements per layer wherein, as mentioned above, FIG. 5 does not illustrate absolute layer advance increments but the deviation from a nominal layer advance increment, such as 0.1 mm. The dashed sine wave curve plotted in FIG. 5 has been derived from the measurements using an LSQ method. The sine wave reflects a good approximation of the displacement error and can be used for compensating said error. More specifically, the drive signal provided by the motor driver 46 to the motor 28 can be calibrated using a term describing said sine wave to drive the motor 28 in rotation angle increments corresponding to a nominal layer advance, such as 100 μm, minus the sines of the amplitude and phase as calculated for the respective layer during the regression algorithm illustrated with respect to FIG. 5. An example of the sinusoidal signal eventually applied by the motor driver 46 to generate a calibrated layer advance is illustrated in FIG. 6. The sine wave approximation, derived from the measurement data, can be calculated in the controller 60 of the calibration tool 50 and can be provided to the controller 40 of the built unit 10 for deriving the calibrated motor driver signal. Alternatively or additionally, calibration values can be determined for each layer advance increment.

Assuming that the error in layer advance is caused largely by mechanical run out of the lead screw 34, the compensated sinusoidal signal will be applied by the motor driver 46 in phase with the lead screw 34, using both the rotary encoder/sensor of the motor 28 and the optical sensor or encoder 48 at the lead screw 34 or at the output of the gear unit 30 which detects each lead screw revolution. Both sensors can be used to determine both the absolute current angular position of the lead screw 34 and the current vertical position of the build platform. In addition to the encoder/sensor of the motor 28, the sensor or reader 48 is used to detect a reference angular position of the lead screw 34, such as 0°. The sensor or reader can be an optical or mechanical sensor or reader, for example. The calibrated layer advance motor driver signal can at least partly compensate the layer advance error measured by the calibration tool 50. More particularly, when controlling the motor 28 based on the calibrated layer advance increments, the layer advance error can be reduced to an acceptable level, such as below 10%, 5%, 4%, or even 3% of the nominal layer advance increment.

The sinusoidal term for calibrating the layer advance increments can be stored in the memory 44 of the controller 40, in the form of a functional term or a lookup table (LUT), for example, as determined during the calibration run. The sinusoidal correction term can be expressed by the following formula: $P_{err}(x) = A \cdot \sin(\Theta x + alpha)$, wherein $P_{err}$ is the calibration error which can be used as a correction term, A is the amplitude of the sinewave derived from the measurement results, and $\Theta$ is a constant proportional to the lead screw angle corresponding to the layer advance increments, x is the number of layer and alpha is the constant for the phase of the sinewave. If there is substantial impact of additional mechanical components on the accuracy of layer advance, the correction term can be modified; for example, it can include additional constant terms and/or sine or cosine terms.

Figure 7:
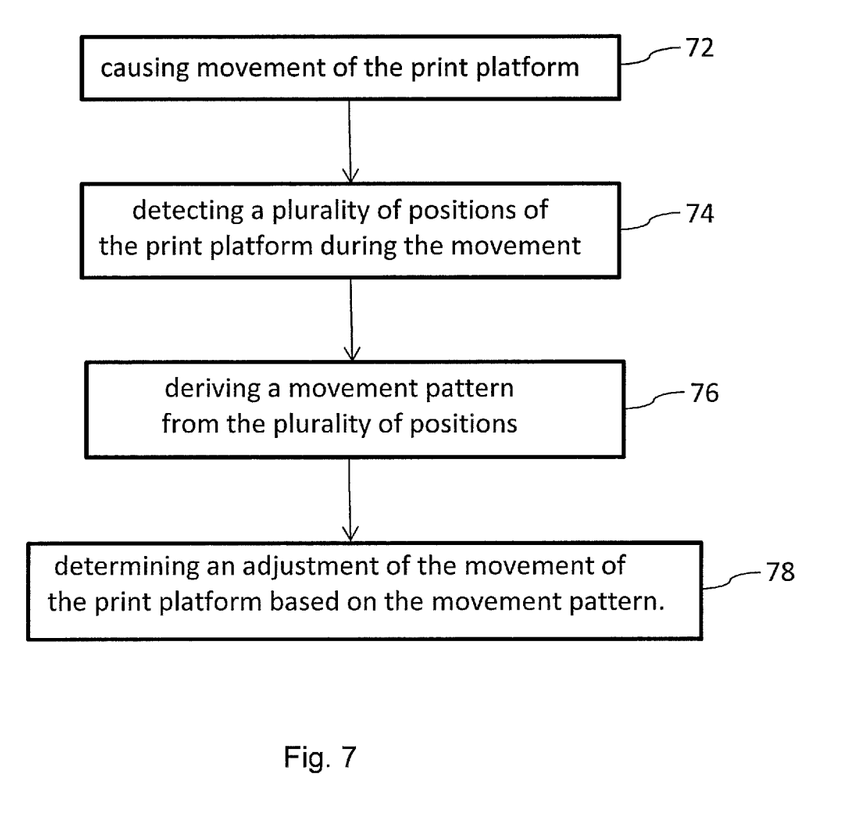
FIG. 7 shows a flow diagram of an example of a calibration method.

An example of a method for calibrating movement of the build platform of a build unit is now described with reference to FIG. 7. Calibration of the movement of the build platform is performed in a calibration run wherein the calibration run can be performed at the time of manufacturing the build unit or deriving servicing of the build unit using the calibration tool 20, shown in FIGS. 3 and 4, for example. During the calibration run, when the build unit is in the calibration tool, movement of the build platform 20 is caused so that the build platform 20 moves vertically step-by-step, corresponding to a nominal layer advance increment; see block 72. One example of a nominal layer advance increment is 0.1 mm. After the each step, the build platform 20 is stopped and the vertical position of the build platform is detected by the contact displacement sensor 56; see block 74. Movement of the build platform and position detection or measurement is repeated several times.

Whereas it is possible to detect all vertical positions of the build platform corresponding to the entire range of the advance positions of the build platform, depending on the vertical distance covered by the build platform and the number of layer advances, detecting and processing all layer advance positions might consume a high amount of time, such as 5 to 8 hours. In this regard, it should be noted that the calibration run usually is performed at the lowest speed of the build platform to assure high position and detection accuracy. Therefore, instead of measuring platform positions across the entire range of possible layer advance positions, calibration also can be performed based on measuring one or more defined subsets of layer advance positions of the build platform. For example, a subset of layer advance increments close to the top position of the build platform, a subset of layer advance increments close to the bottom position of the build platform, and a subset of layer advance increments close to a middle position of the build platform can be determined. Each subset of layer advance increments should include sufficient increments to cover at least one full revolution of the lead screw. Assuming that one complete revolution of the lead screw corresponds to a vertical movement of the build platform by 3 mm, one subset of layer advance increments could cover a vertical movement of the build platform by about 10 mm, for example.

Each of the subsets of layer advance increments is used to derive a movement pattern wherein deriving the movement pattern may comprise deriving an expression of the plurality of positions, the expression including a sinusoidal term; see block 76. If the sinusoidal terms derived from two or more of the subsets are identical or similar, it may be assumed that the mechanical error, along the length of the lead screw has the same or a similar effect on the layer advance increments. Then the same calibrating expression can be used for correcting the drive signal of motor 28 over the entire length of the lead screw. If, however, it turns out that the sinusoidal terms derived from two or more of the subsets differ from each other, it might be recommendable to derive different expressions for providing different corrections of the drive signal of the motor over different subsections along the length of the lead screw. Terms are considered to be identical or similar, if they differ from each other less than a defined degree, e.g. less than about 10% of the amplitude of the signal. Accordingly, terms are considered to differ from each other, if they are different by more than a defined degree, e.g. by 10% or more of the amplitude of the signal. Also phase variation can be taken into account. It is also possible to derive a single expression for correcting the drive signal over the entire length of the lead screw on the basis of a combination of two or more of the subsets. This could be done by calculating an average of two or more expressions or by weighting the amplitude and/or phase, for example.

Based on the movement pattern and the expression derived therefrom, it is possible to determine the layer advance error and a corresponding adjustment of the movement for correcting the layer advance error; see block 78. This adjustment can be determined in the form of a mathematical expression or in the form of a number of values, such as in a lookup table. In either form, the adjustment can be stored as a calibration function or values for the operation of the build unit. For example, the adjustment can be stored in memory 44 controller 44 for use during operation of the build unit. The corrected or calibrated drive signal for the motor 28 then can be determined by adding or subtracting the correction or calibration term to/from the nominal layer advance increments.

Further, it is possible to perform the calibration run in a sequence of calibration runs. In a first calibration run, a first plurality of vertical positions of the build platform is measured over only a section of the movement range, for example 5%, 10%, or 20% of the movement range. Then a first movement pattern is derived from the measured positions; and a first adjustment is determined based on the movement pattern. Then a second calibration run is performed wherein the platform is moved with the first adjustment applied to the motor drive signal. A second plurality of vertical positions is measured wherein these positions can be the same or different from the positions measured during the first calibration run. In particular, they can cover different sections of the movement range of the platform. A second movement pattern can be derived from the second plurality of measurements. If the second movement pattern shows that the layer advance error is below a defined threshold, e.g. below 10% or 5% of the nominal layer advance increment, the calibration can be considered to be completed. If, however, the layer advance error at least in part of the vertical positions of the build platform is above the defined threshold, a further adjustment is derived from the second movement pattern and/or additional positions of the build platform are detected for deriving one or more further movement patterns and corresponding adjustments. This sequence can be repeated until a correction term or correction values have been determined which result in a layer advance error which is below the threshold over the entire movement range of the build platform.

In a first calibration run or further calibration runs, instead of measuring the build platform position at every layer advance increment, it would be possible to measure the positions at a defined integer multiple of layer advance increments, such as every second, third etc. increment and to derive a corresponding correction term.

Figure 8:
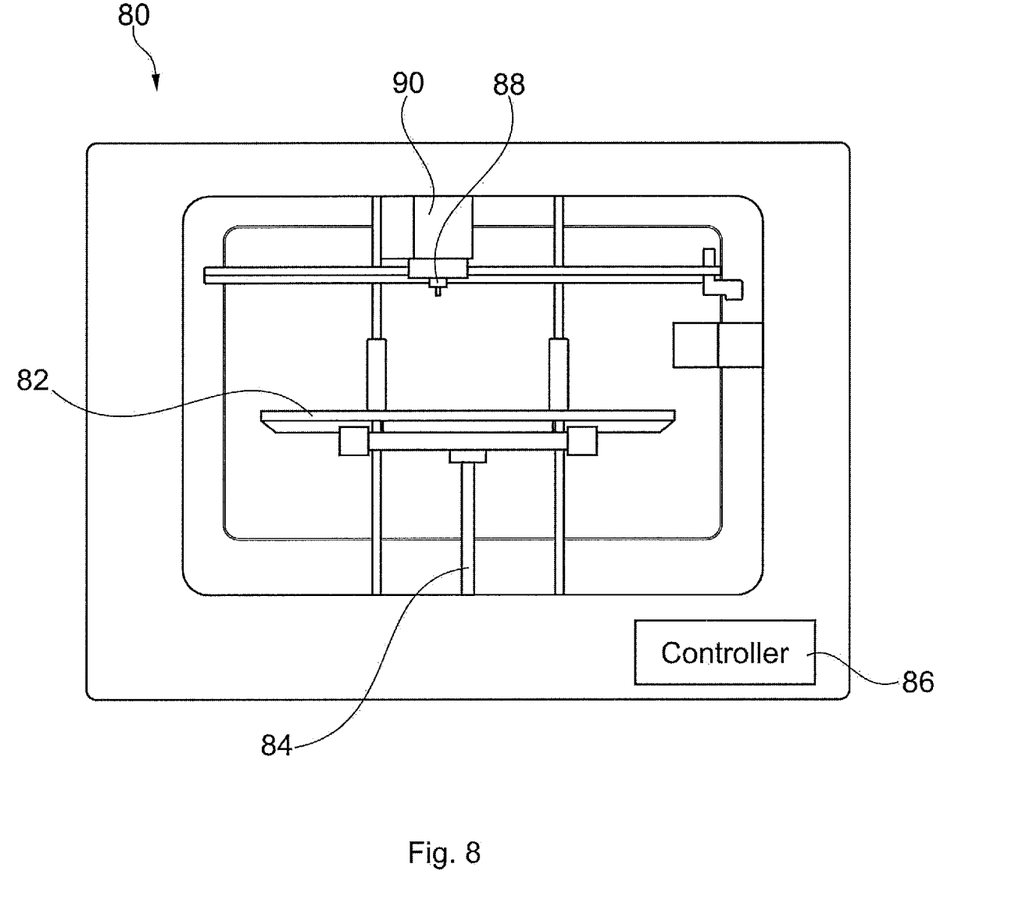
FIG. 8 shows a schematic diagram of an example of a 3D printer.

FIG. 8 shows an example of a three-dimensional (3D) printer 80. The printer 80 comprises a build platform 82 which is movable in the vertical direction via a drive mechanism which is schematically shown as a lead screw 84. Lead screw 84 is coupled to a drive motor and gear mechanism (not shown), as described with reference to build unit 10. The drive mechanism is coupled to a controller 86, including a microprocessor, a motor driver and memory, for example. The controller 86 can be adapted to drive the motor to cause the print 82 to move vertically, in either nominal layer advance increments or calibrated layer advance increments, based on an adjustment term or adjustment values stored in a memory coupled to the controller 86. The printer 80 further comprises a print nozzle 88 which is mounted on a carriage 90. The carriage 90 is configured to move in two dimensions across the plane parallel to and above the build platform 82. The printer 80 further may comprise a heat source for fusing deposited powder material. Layers of print powder are formed on top of the build platform 82 or a substrate carried by the platform. After each layer is deposited, the platform is lowered step-by-step, in increments corresponding to one layer advance. Before depositing a new layer, the previous layer may be fused.

Vertical movement of the build platform 82 may be calibrated as described above, taking into account repetitive layer advance errors caused by mechanical parts of the drive mechanism, such as due to a mechanical run out of the lead screw but also of other parts. This allows manufacturing the mechanical parts of the build unit with more relaxed tolerances, because mechanical imperfections can be compensated by the calibration method. Accordingly, manufacture and assembly of the drive mechanism of the build unit will become cheaper. The motor driver will always know the exact position of the lead screw, using the sensor 48, including the exact absolute position of the lead screw in terms of the rotation angle. Accordingly, the correct calibration value can be applied in each layer wherein it is possible to determine a calibration term which will be applied over the entire range of build platform movement, or a number of calibration terms for a number of subsections of the build platform movement, or even a plurality of calibration values wherein one dedicated calibration value is derived for each individual layer advance increment.

Figure 9:
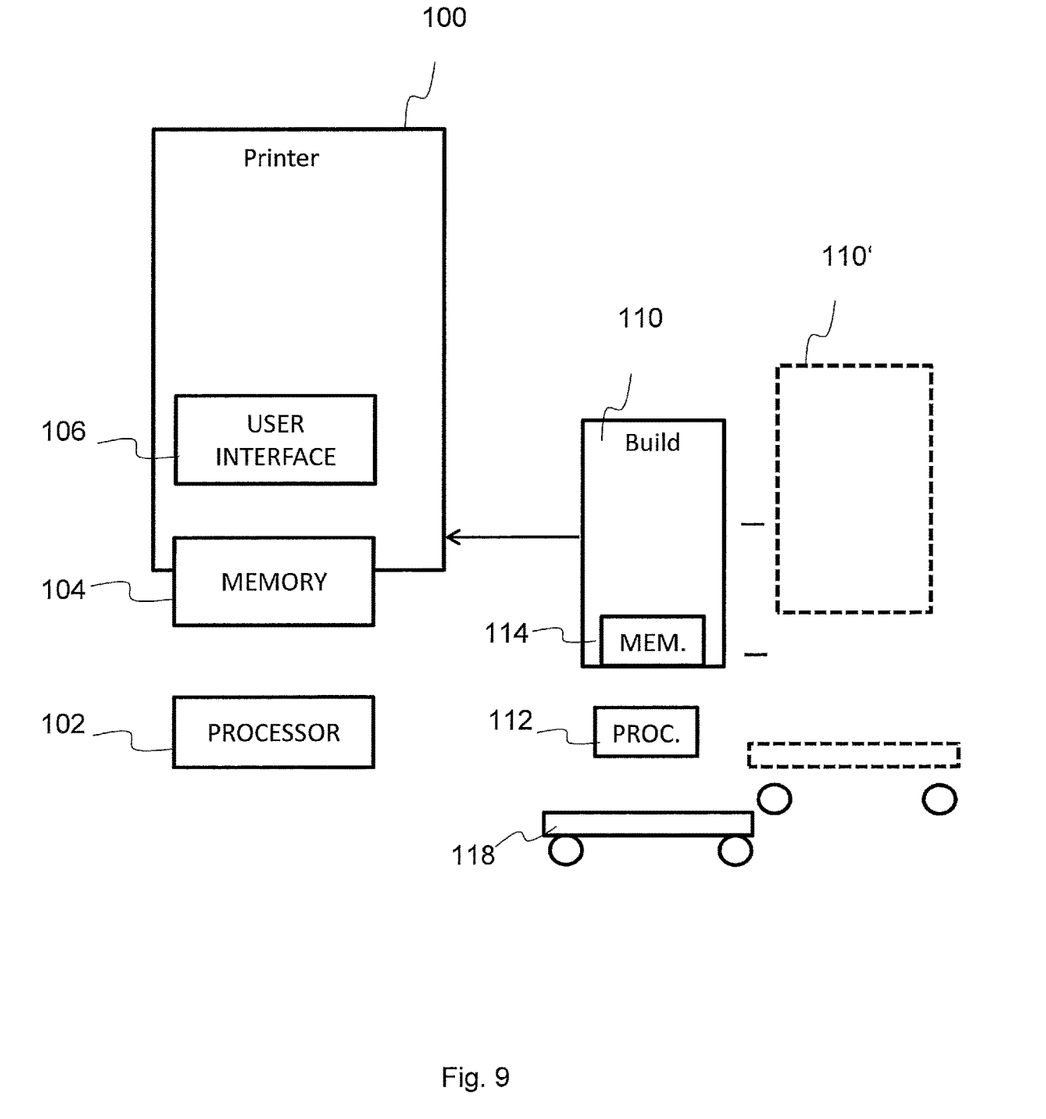
FIG. 9 shows a schematic diagram of an alternative example of an additive manufacturing system.

The build unit may be associated with the printer in such a way that it is integrated with the printer, as described above and as shown in FIG. 8, or it may be provided as a separate unit to be associated with the printer, as schematically shown in FIG. 9. FIG. 9 shows a schematic diagram of an example of an additive manufacturing system. The example of the additive manufacturing system shown in FIG. 9 comprises a printer 100, and a build unit 110. The printer 100 may be a 3D printer, as described above. The build unit 110 may be introduced into the printer 30 during manufacture of a three-dimensional object, as also described above. The build unit 32 may be provided on a trolley 118 for moving the build unit 110 to the printer 100 and away from the printer 100. Movement of the build unit 110 is suggested by the dashed line reproduction 110' of the build unit. Each one of the printer 100, and the build unit 110 may comprise a respective dedicated processor 102, 112 and a respective dedicated memory 104, 114, as shown in FIG. 9. Further, in the example shown in FIG. 9, the printer comprises a user interface 106. Alternatively or additionally, a user interface may be provided at the build unit 110 or at a remote terminal (not shown).

If the build unit 110 is provided as an entity separate from the printer 100, operating an additive manufacturing device according to one example may comprise associating the build unit 110 with a three-dimensional printer 100 or inserting the build unit into the printer, before the additive manufacturing process begins. The build unit 110 may include a build platform and a platform drive mechanism, as described above. The printer may control movement of the build platform via the platform drive mechanism using the calibration data stored in memory 104 wherein the calibration data cause an adjustment of the movement of the platform based on a movement pattern determined in a calibration run. The calibration data can be stored with the build unit 110, such as in memory 114, and can be transferred to the printer when the build unit is associated with the printer. The calibration data can represent a sinusoidal correction term.

The invention claimed is:

1. A method of operating an additive manufacturing device including calibrating movement of a platform on which objects are formed by the additive manufacturing device, the method comprising:
   in a calibration run, causing movement of the platform, wherein causing movement of the platform causes the platform to move in a vertical direction in a build unit; and wherein causing movement of the platform causes the platform to move in first increments, each first increment corresponding to a nominal layer thickness of a print medium to be deposited in a 3D print job, and detecting a plurality of positions comprises detecting vertical positions of the platform at a defined plurality of said first increments;
   detecting a plurality of positions of the platform during the movement;
   deriving a movement pattern from the plurality of positions, wherein deriving the movement pattern comprises deriving an expression of the plurality of positions, the expression including a sinusoidal term; and
   determining an adjustment of the movement of the platform based on the movement pattern.

2. The method of claim 1 wherein detecting a plurality of positions comprises detecting vertical positions of the platform at regular intervals during stepwise movement of the platform.

3. The method of claim 1 wherein determining the adjustment comprises deriving a correction term from the expression and deriving second increments of vertical platform movement based on the first increments and the correction term.

4. The method of claim 3 wherein deriving the second increments of vertical platform movement comprises combining the first increments and the correction term by subtraction or addition.

5. The method of claim 1 wherein deriving the movement pattern comprises deriving an expression of the plurality of positions using a Least Square method.

6. The method of claim 1 wherein determining the adjustment comprises use of a look up table.

7. The method of claim 1, the method further comprising:
   associating a build unit with a three-dimensional printer, the build unit including the platform as a build platform and a platform drive mechanism;
   wherein the printer controls movement of the build platform via the platform drive mechanism using calibration data wherein the calibration data cause an adjustment of the movement of the platform based on the movement pattern determined in the calibration run.

8. The method of claim 7 wherein the calibration data are stored with the build unit and are transferred to the printer when the build unit is associated with the printer.

9. Method of claim 7 wherein the calibration data represent a sinusoidal correction term.

10. The method of claim 1, wherein the plurality of positions comprises a number of layer advance increments at a top of a vertical range of movement of the platform, at a bottom of the range of the platform and in an intermediate portion of the range of the platform.

11. A build unit including:
    a build platform;
    a platform drive mechanism, the platform drive mechanism comprising a lead screw;
    a memory storing at least one of a correction function or correction values derived in a calibration run; and
    a controller operatively coupled to the memory, the controller including program code to control the platform drive mechanism to cause the build platform to move in increments in a direction, wherein the increments are determined based on first nominal increments and (the correction function or correction values), wherein the first nominal increments correspond to equal pitch rotation angles of the lead screw, and the correction function or correction values correct a sinusoidal error of the vertical platform movement due to a mechanical run-out of the lead screw.

12. The build unit of claim 11, wherein the correction function or correction values are different for different parts of a vertical range of movement of the build platform.

13. A build unit comprising:
    a build platform;
    a platform drive mechanism, the platform drive mechanism comprising a lead screw;
    a memory storing a correction function or correction values based on the correction function as derived in a calibration run; and
    a controller operatively coupled to the memory, the controller including program code to control the platform drive mechanism to cause the build platform to move in increments in a vertical direction, wherein the increments are determined based on first nominal increments and the correction function or correction values;

wherein the correction function includes a sinusoidal term.

14. The build unit of claim 13, further comprising a calibration tool to receive the build platform and platform drive mechanism, the calibration tool comprising a sensor for sensing a vertical position of the build platform after each of a plurality of movements during the calibration run.

15. The build unit of claim 14, wherein the sensor is a contact displacement sensor.

16. The build unit of claim 14, wherein the sensor is an optical sensor.

* * * * *